United States Patent Office 3,059,019
Patented Oct. 16, 1962

3,059,019
CYCLOPENTANOPHENANTHRENE COMPOUNDS AND PROCESS
Howard J. Ringold, Mexico City, Mexico, assignor, by mesne assignments, to Syntex Corporation, a corporation of Panama
No Drawing. Filed June 24, 1960, Ser. No. 38,420
Claims priority, application Mexico Sept. 25, 1959
30 Claims. (Cl. 260—468)

The present invention relates to novel cyclopentanophenanthrene compounds and to a process for preparing same.

More particularly the present invention relates to novel androstanes in which ring B is enlarged by one carbon atom and more specifically to B-homoandrostanes having a keto, a hydroxy or acyloxy group in α or β steric configuration at C–3; a keto, a hydroxy or acyloxy group at C–17β, and which may also contain an aliphatic hydrocarbon group at C–17α, a double bond at C–1, 2 and/or C–4, 5.

The novel compounds of the present invention are valuable therapeutic androgenic type compounds which exhibit anabolic activity as well as antigonadotrophic activity. For example, β-homodihydroallotestosterone upon subcutaneous administration in mice exhibited an androgenic effect equal to that of testosterone with a myotrophic effect twice as strong.

The novel compounds of the present invention can be illustrated by the following formulas:

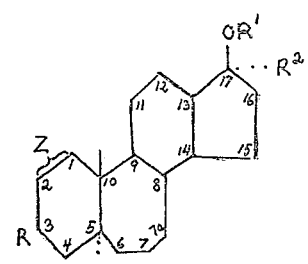

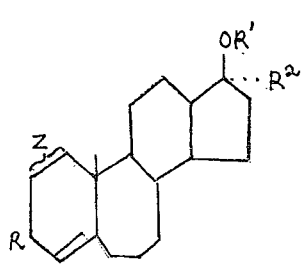

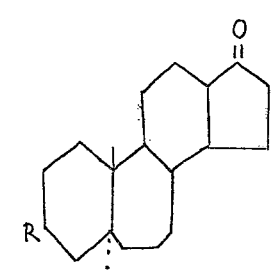

In the above formulas, Z indicates a double bond or a saturated linkage between C–1 and C–2; R represents keto, α-hydroxy, β-hydroxy, α-acyloxy or β-acyloxy; R' represents hydrogen or an acyl group; and $R^2$ represents hydrogen or an aliphatic hydrocarbon radical containing from 1 to 8 carbon atoms, saturated or unsaturated, of straight or branched chain and which may contain one or more double or triple bonds in the chain. Typical of such aliphatic hydrocarbon radicals are the methyl, ethyl, propyl, butyl, tertiary butyl, vinyl, propenyl, 1-butenyl, ethinyl, 2-butenyl, and ethoxyethinyl.

The acyl group is derived from hydrocarbon carboxylic acids containing up to 12 carbon atoms, saturated or unsaturated of straight, branched, cyclic or cyclic-aliphatic chain and which may be substituted with functional groups such as hydroxyl, acyloxy, alkoxy, amino, nitro and halogen. Typical such esters are the acetate, propionate, butyrate, hemisuccinate, caproate, benzoate, trimethylacetate, phenoxyacetate, aminoacetate, cyclopentylpropionate and β-chloropropionate.

The novel compounds of the present invention are prepared by a process illustrated by the following equation:

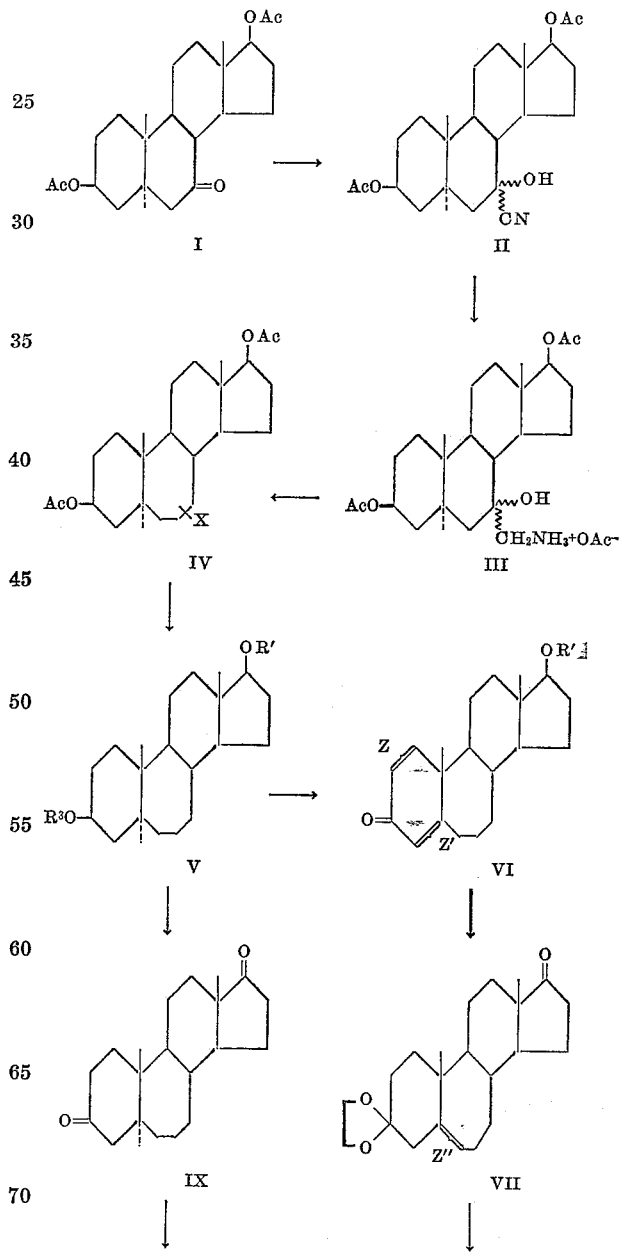

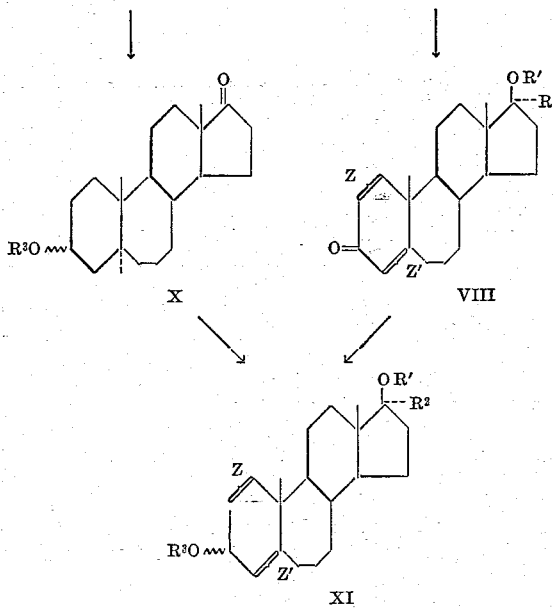

In the above formulas, Ac represents acetyl; X represents keto; Z' indicates a double bond or a saturated linkage between C-4 and C-5; Z" indicates a double bond or a saturated linkage between C-5 and C-6; $R^3$ indicates hydrogen or an acyl group of the same type previously set forth; Z, R' and $R^2$ have the same meaning as hereinabove set forth.

The wavy line at C-3 and at C-7 indicate the α or β steric configuration for the substituents thereat.

In carrying out the process outlined above, the diacetate of 7-keto-androstane-3β,17β-diol (I) [described by Butenandt et al., Ber. 71, 1316 (1938) and by Heusler et al., Helv. Chim. Acta, 35, 284 (1952)] in acetone solution was treated with a large excess of α-hydroxy-isobutyronitrile at room temperature in the presence of aqueous sodium hydroxide. The thus formed 3,17-diacetate of 7-cyano-androstane-3β,7β,17β-triol or of 7-cyano-androstane-3β,7α,17β-triol (II) was hydrogenated in glacial acetic acid in the presence of a pre-reduced catalyst until two molar equivalents of hydrogen had been absorbed. After dilution with water and filtering, the solution of the intermediate aminomethyl-acetate (III) was treated at low temperature with a large excess of sodium nitrite dissolved in water to obtain the diacetate of B-homo-androstane-3β,17β-diol having a keto group in ring B at C-7 or C-7a (IV).

For the reductive elimination of the keto group, there was applied the method described by Huang-Minlon, J. Am. Chem. Soc. 68, 2487 (1946), a modification of the Wolff-Kishner reduction, which reaction simultaneously caused hydrolysis of the acetoxy groups and resulted in the formation of B-homo-androstane-3β,17β-diol (V; R'=$R^3$=hydrogen). By treatment of the latter compound with acetic anhydride in pyridine, there was obtained the diacetate (V; R'=$R^3$=acetyl). By selective hydrolysis as by treatment with 2% aqueous methanolic potassium hydroxide solution at low temperature, there was obtained the 17-monoacetate of B-homo-androstane-3β,17β-diol (V; R'=acetyl; $R^3$=hydrogen). Upon subsequent oxidation of the latter monoacetylated diol by reaction with chromic acid in aqueous acetic acid, there was obtained the acetate of B-homo-dihydroallotestosterone (VI; Z=Z'=single bond; R'=acetyl).

For producing B-homo-dihydroallotestosterone substituted at C-17α with an aliphatic hydrocarbon group of the type previously mentioned, the acetate of B-homo-dihydroallotestosterone was saponified to form the free B-homo-dihydroallotestosterone (VI; Z=Z'=single bond; R'=hydrogen) by conventional methods, as for example by treatment with methanolic potassium hydroxide or methanolic sodium methoxide solution. The keto group at C-3 was then protected by formation of the 3-cycloethyleneketal, achieved by refluxing the B-homo-dihydroallotestosterone with ethylene glycol in the presence of p-toluenesulfonic acid; the 17β-hydroxyl group was then oxidized to the keto group by reaction with chromium trioxide-pyridine complex. The resulting 3-ethylenedioxy-B-homo-androstane-17-one (VII; Z"=single bond) was then reacted with an aliphatic hydrocarbon magnesium halide to convert the 17-keto group into the 17β-hydroxy-17α-aliphatic hydrocarbon grouping. Thus by reaction with methyl magnesium bromide, the 17α-methyl-17β-hydroxy grouping was formed and by similar reaction with an ethyl, vinyl, ethinyl or ethoxyethinyl Grignard reagent there was formed the 17β-hydroxy compound with the respective hydrocarbon radical at C-17α. Alternatively, the 17α-ethyl group was obtained by reaction with ethyl-lithium, and the ethinyl group was introduced by the conventional reaction with potassium acetylide. After acidifying, there was finally hydrolyzed the ketal group with regeneration of the 3-keto group. The ethinyl group was hydrogenated partially to the vinyl group, preferably in pyridine and in the presence of palladium on calcium carbonate; by complete hydrogenation, the vinyl group was further converted into the ethyl group. There were thus obtained the C-17α substituted B-homo-dihydroallotestosterone represented by Formula VIII wherein Z and Z' indicate saturated linkages, R' is hydrogen and $R^2$ is an aliphatic hydrocarbon radical.

By monobromination at C-2 of the acetate of B-homo-dihydroallotestosterone (VI; Z=Z'=single bond; R'=acetyl) followed by dehydrobromination as for example by reaction with calcium carbonate in dimethylformamide, there was obtained the acetate of B-homo-Δ¹-androsten-17β-ol-3-one (VI; Z=double bond; Z'=single bond; R'=acetyl). By dibromination there was obtained the intermediate acetate of 2,4-dibromo-B-homo-dihydroallotestosterone; the selective dehydrobromination at C-4 was achieved by conversion of the 2,4-dibromo compound into the 2-iodo-Δ⁴-compound by reaction with sodium iodide and subsequent reductive deiodination by means of chromous chloride, thus giving the acetate of B-homo-Δ⁴-androsten-17β-ol-3-one (VI; Z=single bond; Z'=double bond; R'=acetyl); by dehydrobrominating the intermediate 2,4-dibromo compound, for example, by refluxing with γ-collidine, there was obtained the acetate of B-homo-Δ¹,⁴-androstadien-17β-ol-3-one (VI; Z=Z'=double bond; R'=acetyl). The latter diene was also obtained by refluxing the acetate of B-homo-Δ⁴-androsten-17β-ol-3-one with selenium dioxide in tertiary butanol and in the presence of catalytic amounts of pyridine. The latter reaction also afforded the introduction of only one double bond at C-1, 2 when starting from the 5-allo compound and shortening the reaction period. The dehydrogenation at C-1, 2 may also be effected by microbiological methods, as by incubation with *Corynebacterium simplex* ATCC 6946.

The method of introducing the 17β-hydroxy-17α-aliphatic hydrocarbon grouping was also applied to B-homo-Δ⁴-androsten-17β-ol-3-one (VI; Z=single bond; Z'=double bond; R'=hydrogen). The free B-homo-Δ⁴-androsten-17β-ol-3-one was obtained by alkaline hydrolysis of the acetate; the 3-cycloethyleneketal was then formed in the same manner set forth above, with probable concomitant migration of the double bond to C-5, 6, followed by oxidation of the 17β-hydroxy group to the keto group (VII; Z"=double bond); the latter was then treated with the reagents set forth above for producing the 17β-hydroxy-17α-aliphatic hydrocarbon grouping. Upon subsequent acidification, there was hydrolyzed the ethylenedioxy group and the 3-keto-Δ⁴-grouping was regenerated. Thus, there were obtained the respective 17α-alkyl, 17α-alkenyl-, and 17α-alkinyl-B-homo-Δ⁴-androsten-17β-ol-3-one (VIII; Z=single bond; Z'=double bond; R'=hydrogen; R²=aliphatic hydrocarbon radical). By subsequent dehydrogenation by means of selenium dioxide, there was obtained the respective 17α-aliphatic hydrocarbon-B-homo-$\Delta^{1,4}$-androstadien-17β-ol-3-one (VIII; Z=Z'=double bond; R'=hydrogen; R''=aliphatic hydrocarbon radical).

Upon oxidation of the B-homo-androstane-3β,17β-diol (V; R'=R³=hydrogen) with chromic acid, preferably in aqueous acetic acid, there was obtained B-homo-androstane-3,17-dione (IX), which upon selective reduction as by refluxing with partially deactivated Raney nickel, that is, with Raney nickel which was previously prepared and which was no longer pyrophoric, was converted into B-homo-androstan-3α-ol-17-one (X; R³=hydrogen; 3α). By catalytic hydrogenation in the presence of freshly prepared Raney nickel or by reduction with limited quantities of sodium borohydride, the B-homo-androstane-3,17-dione was converted into B-homo-androstan-3β-ol-17-one (X; R³=hydrogen; 3β).

The compounds of Formula X were subjected to the method described above for the formation of the 17β-hydroxy-17α-aliphatic hydrocarbon radical grouping and thus there were produced the corresponding 17α-alkyl-, 17α-alkenyl-, and 17α-alkinyl-B-homo-androstane-3α,17β-diols and 17α-alkyl-, 17α-alkenyl-, and 17α-alkinyl-B-homo-androstane-3β,17β-diols (XI; R'=R³=hydrogen; Z=Z'=single bond; 3α or 3β, respectively).

By reduction of the 17α-aliphatic hydrocarbon substituted B-homo-dihydroallotestosterones, $\Delta^1$-androsten-17β-ol-3-ones, $\Delta^4$-androsten-17β-ol-3-ones and $\Delta^{1,4}$-androstadien-17β-ol-3-ones of Formula VIII as by reaction with a double hydride such as sodium borohydride, there were obtained the B-homo-diols correspondingly substituted at C-17α of Formula XI wherein Z and Z' represent single or double bonds; R' and R³ each represent hydrogen and R² represents the respective aliphatic hydrocarbon radical; as main products, there were isolated the 3β-isomers.

The acetoxy groups in the acetylated B-homo-compounds described above were hydrolyzed by conventional methods as by treatment with dilute methanolic potassium hydroxide or with sodium methoxide in methanol. The hydrolysis may be selective, thus effecting hydrolysis of the secondary acetate group at C-3 and leaving intact the tertiary acetate group at C-17β; or the hydrolysis may be complete, thus effecting hydrolysis of both the secondary and tertiary acetate groups. The secondary hydroxyl groups were reesterified by reaction in pyridine solution with the hydrocarbon carboxylic acid anhydride or chloride containing up to 12 carbon atoms of the type described hereinabove; the tertiary hydroxy group at C-17β was esterified by reaction with the acid anhydride in benzene and in the presence of catalytic amounts of p-toluenesulfonic acid, with simultaneous esterification of a free hydroxyl group at C-3. By these esterification methods, there were prepared 3-mono-esters as well as 3,17-diesters having identical ester groups or ester groups different from each other.

The following examples serve to illustrate but are not intended to limit the scope of the invention:

*Example I*

A solution of 10 g. of the diacetate of androstane-3β,17β-diol-7-one in 30 cc. of acetone-cyanhydrin (α-hydroxy-isobutyronitrile) and 0.5 cc. of 10% aqueous sodium hydroxide solution was kept at room temperature for 2 hours; it was then poured into 1 lt. of ice water containing 2 cc. of acetic acid, stirred vigorously until the oil which had separated turned solid and then kept overnight at 0° C. The precipitate was collected by filtration, washed with water and dried. There was thus obtained the crude diacetate of cyanhydrin of androstane-3β,17β-diol-7-one, namely the 3,17-diacetate of 7-cyano-androstane-3β,7β,17β-triol, with M.P. 137–142° C. (dec.).

The above compound was dissolved in 200 cc. of glacial acetic acid and hydrogenated in the presence of 3 g. of pre-reduced Adams catalyst, at 570 mm. and 25° C. After 70 minutes the absorption of hydrogen ceased; there was consumed 1.9 molar equivalents of hydrogen. The mixture was diluted with 1 lt. of water, filtered through celite and the resulting clear solution of the intermediate aminomethylacetate was cooled to —5° C. The cooled solution was treated with a solution of 20 g. of sodium nitrite in 100 cc. of water, little by little, under continuous stirring and taking care that the temperature did not rise over 0° C. The mixture was warmed to room temperature and kept standing overnight; the precipitate formed was then collected, washed with water and recrystallized from methanol. There was thus obtained the diacetate of B-homo-androstane-3β,17β-diol substituted in the B-homo ring with a keto group (7 or 7a); M.P. 200–203° C., [α]$_D$ —77° (chloroform), infrared maxima at 1700 and 1736 cm.$^{-1}$ (CS$_2$).

A solution of 5 g. of the above compound in a mixture of 50 cc. of ethylene glycol and 50 cc. of diethylene glycol containing 15 cc. of hydrazine hydrate was refluxed for 2 hours, at the end of which the mixture was cooled and treated with 12 g. of potassium hydroxide dissolved in 12 cc. of water. The mixture was then subjected to a slow distillation until the reaction mixture attained a temperature of 195° C. A reflux condenser was then attached and the mixture was kept between 195 and 200° C. for 2½ hours. After cooling the mixture was poured into cold saturated aqueous chloride solution and the precipitate consisting of the crude B-homo-androstane-3β,17β-diol was collected, washed with water, dried and purified by recrystallization from acetone and then from ethyl acetate. The crude product melted between 153 and 155° C., [α]$_D$ +33° (chloroform); in the infrared, determined in carbon disulfide, there was only observed the characteristic band of the hydroxyl groups.

In accordance with the method described above there was prepared 5.25 g. of B-homo-androstane-3β,17β-diol, which was mixed with 25 cc. of pyridine and 25 cc. of acetic anhydride and heated for 2 hours at 90° C.; the cooled mixture was poured into ice water and the product was extracted with methylene chloride. The extract was successively washed with dilute hydrochloric acid, aqueous saturated sodium bicarbonate solution and water, dried over anhydrous sodium sulfate and the solvent was evaporated. There was thus obtained the diacetate of B-homo-androstane-3β,17β-diol under the form of an oil, which product no longer showed the hydroxyl bands in the infrared.

The above product was dissolved in 100 cc. of methanol, cooled to 0° C. and treated with a solution of 2 g. of potassium hydroxide in 10 cc. of water for 8 hours at a temperature between 0 and 5° C. It was then neutralized with acetic acid, concentrated to a small volume under reduced pressure, poured into ice water and extracted with methylene chloride. The extract was chromatographed on 100 g. of silica gel and upon elution with benzene-ether (4:1) there was obtained the 17-monoacetate of B-homo-androstane-3β,17β-diol, M.P. 115–120° C. The analytical sample, obtained by recrystallization from ethyl acetate, showed M.P. 117–120°, [α]$_D$ +25° (chloroform); the infrared spectrum showed the characteristic acetate and hydroxyl bands.

*Example II*

A solution of 1 g. of the 17-acetate of B-homo-androstane-3β,17β-diol (cf. the preceding example) in 40 cc. of 80% acetic acid was treated with 500 mg. of chromium trioxide dissolved in 20 cc. of 80% acetic acid and the mixture was kept at 25° C. for 1 hour. It was then poured into water, extracted with chloroform and the extract was washed with 5% aqueous sodium carbonate solution and water, dried over anhydrous sodium sulfate and the solvent was evaporated. The residue consisted of the acetate of B-homo-dihydroallotestosterone which was used for the next step without further purification.

The above compound was refluxed for 1 hour with 100 cc. of 1% potassium hydroxide solution, then neutralized with acetic acid, the solvent was removed under reduced pressure and the residue was triturated with water. The solid was collected by filtration, dried and purified by chromatography on 40 g. of neutral alumina; the solutions eluted with benzene-ether 9:1 were combined and the product thus obtained was crystallized first from acetone-water and then from acetone-hexane, thus affording B-homo-dihydroallotestosterone, M.P. 142–146° C. $[\alpha]_D$ +37° (chloroform); infrared maximum ($CS_2$) at 1712 cm.$^{-1}$; there was further observed the free hydroxyl band.

*Example III*

A solution of 1 g. of the acetate of B-homo-dihydroallotestosterone of the preceding example in 60 cc. of glacial acetic acid was treated with three drops of a 4 N solution of hydrogen bromide in acetic acid. It was then treated dropwise and under mechanical stirring with a solution of bromine in glacial acetic acid containing 1.05 molar equivalents of bromine. After complete decolorization water was added and the precipitate was collected by filtration, washed with water and dried, thus furnishing the acetate of 2-bromo-B-homo-dihydroallotestosterone.

The above compound was mixed with 10 cc. of γ-collidine and refluxed for 45 minutes; the cooled mixture was diluted with ether, filtered from collidine hydrobromide, successively washed with dilute hydrochloric acid, aqueous saturated sodium bicarbonate solution and water, dried over anhydrous sodium sulfate and the solvent was evaporated. The residue was dissolved in a mixture of hexane and benzene and filtered through a column of 5 g. of aluminum oxide (washed with ethyl acetate). The filtrate was evaporated to dryness and the residue recrystallized from ethyl acetate, thus yielding the acetate of B-homo-$\Delta^1$-androsten-17β-ol-3-one.

*Example IV*

By essentially following the procedure described in the preceding example, but using 2.1 molar equivalents of bromine, there was obtained B-homo-$\Delta^{1,4}$-androstadien-17β-ol-3-one acetate via the acetate of 2,4-dibromo-B-homo-dihydroallotestosterone.

*Example V*

A solution was prepared of 0.67 cc. of bromine in 20 cc. of acetone, adding the bromine little by little and waiting until decolorization before adding a few more drops of bromine. The solution was cooled to 0° C., treated with 1.8 g. of sodium carbonate and stirred for 25 minutes at 0° C.; it was then filtered and to the filtrate were added 8 g. of sodium iodide dissolved in 400 cc. of acetone; the mixture was refluxed for 45 minutes and cooled.

To the above solution was added 4 g. of 2,4-dibromo-B-homo-dihydroallotestosterone, prepared as described in the preceding example. The mixture was refluxed for 5 hours at the end of which was added 3.5 g. of oxalic acid and refluxed for half an hour longer, cooled, diluted with ethyl acetate, filtered and the filtrate was washed with water to neutral; finally there was added 5 cc. of glacial acetic acid and 25 cc. of zinc dust and the mixture was stirred until complete decolorization; it was then filtered, and the filtrate was first washed with 5% aqueous sodium bicarbonate solution and then with water; the solution was evaporated to dryness and the residue chromatographed on silica gel. Upon elution with benzene-ether there was obtained the acetate of B-homo-$\Delta^4$-androsten-17β-ol-3-one.

By following the method of hydrolysis described in Example II, there was then prepared the free B-homo-$\Delta^4$-androsten-17β-ol-3-one.

A mixture of 1 g. of the latter compound, 30 cc. of t-butanol, 300 mg. of selenium dioxide and a few drops of pyridine was refluxed for 48 hours, at the end of which it was filtered, the filtrate was evaporated to dryness and the residue was purified by chromatography, thus furnishing $\Delta^{1,4}$-androstadien-17β-ol-3-one.

*Example VI*

In accordance with the method described in Example IV, there was prepared 2 g. of the acetate of 2,4-dibromo-B-homo-dihydroallotestosterone, which was mixed with 2.5 g. of sodium iodide and 65 cc. of methylethylketone and refluxed under an atmosphere of nitrogen for 45 minutes. After cooling, sodium thiosulfate and water were added under vigorous stirring until complete precipitation of the product, which consisted of the acetate of 2-iodo-B-homo-$\Delta^4$-androsten-17β-ol-3-one.

A solution of chromous chloride was prepared as follows: a mixture of 20 g. of zinc dust, 1.6 g. of mercuric chloride, 20 cc. of water and 1 cc. of concentrated hydrochloric acid was stirred for 5 minutes and the supernatant liquid was decanted, there was then added 40 cc. of water and 4 cc. of concentrated hydrochloric acid and finally 10 g. of chromic chloride in portions, under vigorous stirring and under an atmosphere of carbon dioxide. There was thus obtained a dark blue solution of chromous chloride.

The acetate of 2-iodo-B-homo-$\Delta^4$-androsten-17β-ol-3-one was then dissolved in 100 cc. of acetone and treated little by little under an atmosphere of carbon dioxide with 40 cc. of the chromous chloride solution. The mixture was stirred from time to time and after 30 minutes the product was precipitated by the addition of water, collected by filtration, washed with water, dried under vacuum and recrystallized from acetone, thus yielding the acetate of B-homo-$\Delta^4$-androsten-17β-ol-3-one, identical with the intermediate product of the preceding example.

*Example VII*

In accordance with the method described in Example III, there was prepared 1.5 g. of the acetate of 2-bromo-B-homo-dihydroallotestosterone, which was dissolved in 5 cc. of dimethylacetamide and added to a stirred suspension of 0.8 g. of calcium carbonate in 15 cc. of dimethylacetamide which had been previously heated to boiling; the mixture was refluxed for 15 minutes, cooled, poured into 100 cc. of ice water containing 5 cc. of concentrated hydrochloric acid and stirred overnight at room temperature; the precipitate was collected by filtration, washed with water, dried and recrystallized from acetone, thus affording the acetate of B-homo-$\Delta^1$-androsten-17β-ol-3-one, identical with the final product of Example III.

*Example VIII*

In accordance with the method described in Example II, there was prepared 5 g. of B-homo-dihydroallotestosterone in the free form. It was mixed with 300 cc. of anhydrous benzene, 35 cc. of ethylene glycol and 2.5 g. of p-toluenesulfonic acid monohydrate and refluxed for 18 hours, removing the water formed during the reaction by means of a water separator. The mixture was cooled, treated with 50 cc. of 5% aqueous sodium carbonate solution and 200 cc. of water and the benzene layer was separated, washed with water, dried over anhydrous sodium sulfate and the benzene layer was evaporated. The residue consisted of the 3-cycloethyleneketal of B-homo-dihydroallotestosterone which was used for the next step without further purification.

5 g. of the above compound was then treated with 2.5 g. of chromium trioxide in 125 cc. of pyridine at room temperature with stirring for 16 hours; after diluting with ethyl acetate the mixture was filtered and the filtrate was successively washed with dilute hydrochloric acid and water, dried over anhydrous sodium sulfate and the solvent was evaporated. The residue consisted of the 3-cycloethyleneketal of B-homo-androstane-3,17-dione.

A mixture of the above crude compound, 200 cc. of thiophene free anhydrous benzene and 45 cc. of a 3 N solution of methyl magnesium bromide was refluxed for 6 hours; the mixture was then poured into 800 cc. of water containing 80 g. of ammonium chloride and 800 g. of crushed ice, with vigorous stirring. The benzene layer was separated, washed with dilute hydrochloric acid and then with water to neutral, dried over anhydrous sodium sulfate and the benzene was evaporated. The residue was dissolved in 100 cc. of acetone, treated with 2 g. of p-toluenesulfonic acid and the mixture was kept overnight at room temperature. The solution was diluted with water, and the precipitate consisting of 17α-methyl-B-homo-dihydroallotestosterone was collected by filtration, washed with water, dried and recrystallized from acetone-hexane.

1 g. of the above compound was mixed with 200 mg. of selenium dioxide, 50 cc. of t-butanol and a few drops of pyridine and refluxed under an atmosphere of nitrogen for 12 hours. The product was then isolated as described for the reaction of B-homo-$\Delta^4$-androsten-17β-ol-3-one with selenium dioxide in Example V. There was thus finally obtained 17α-methyl-B-homo-1-dehydro-dihydroallotestosterone.

Example IX

In accordance with the method of the preceding example, there was prepared 5 g. of the 3-cycloethyleneketal of B-homo-androstane-3,17-dione.

To a solution of 2 g. of the above compound in 250 cc. of absolute ether was added little by little a solution of 10 molar equivalents of ethyl-lithium in 50 cc. of ether, with mechanical stirring under an atmosphere of nitrogen. The mixture was then stirred for 48 hours at room temperature and under an atmosphere of nitrogen; after pouring into water the mixture was acidified with hydrochloric acid stirring vigorously for 1 hour. The ether layer was separated, washed with water to neutral, dried over anhydrous sodium sulfate, filtered and the ether was evaporated from the filtrate. Recrystallization of the residue from acetone-hexane yielded 17α-ethyl-B-homo-dihydroallotestosterone.

Example X

A solution of 1 g. of potassium metal in 50 cc. of t-butanol was prepared under an atmosphere of nitrogen, cooled to 0° C. and treated with a cold solution of 1 g. of the 3-cycloethyleneketal of B-homo-androstane-3,17-dione (cf. Example VIII), little by little, under an atmosphere of nitrogen, at 0° C. and under continuous stirring. The nitrogen was then substituted by dry purified acetylene and a stream of this gas introduced into the mixture for 40 hours. It was then poured into 200 cc. of dilute hydrochloric acid, stirred for 1 hour at room temperature and the organic solvents were removed by steam distillation. The residue was cooled, the solid collected and recrystallized from acetone-hexane, thus furnishing 17α-ethinyl-B-homo-dihydroallotestosterone.

A solution of 500 mg. of the above compound in 10 cc. of pyridine containing 100 mg. of a pre-reduced palladium on calcium carbonate catalyst was hydrogenated at room temperature until the equivalent of 1 mol of hydrogen had been absorbed; the catalyst was removed by filtration, the pyridine was evaporated under reduced pressure and the residue was triturated with 20 cc. of 1% hydrochloric acid; the product was extracted with ethyl acetate and the extract was washed with water, dried over anhydrous sodium sulfate and evaporated to dryness. By chromatography on neutral alumina there was obtained 17α-vinyl-B-homo-dihydroallotestosterone.

Example XI

By applying the methods of Examples VIII, IX and X to B-homo-$\Delta^4$-androsten-17β-ol-3-one, there were first produced the 3-cycloethyleneketal of B-homo-$\Delta^4$-androsten-17β-ol-3-one, then the B-homo-$\Delta^4$-androstene-3,17-dione and then 17α-methyl-B-homo-$\Delta^4$-androsten-17β-ol-3-one, 17α-ethyl-B-homo-$\Delta^4$-androsten-17β-ol-3-one, 17α-ethinyl-B-homo-$\Delta^4$-androsten-17β-ol-3-one and 17α-vinyl-B-homo-$\Delta^4$-androsten-17β-ol-3-one, respectively.

Example XII

By applying the procedure for the reaction with selenium dioxide described in Example V to the final compounds of the preceding example, there was introduced a second double bond at C-1,2, to produce 17α-methyl-B-homo-$\Delta^{1,4}$-androstadien-17β-ol-3-one, 17α-ethyl-B-homo-$\Delta^{1,4}$-androstadien-17β-ol-3-one, 17α-ethinyl-B-homo-$\Delta^{1,4}$-androstadien-17β-ol-3-one and 17α-vinyl-B-homo-$\Delta^{1,4}$-androstadien-17β-ol-3-one.

Example XIII

A mixture of 4.8 g. of B-homo-androstane-3β,17β-diol (cf. Example I) and 200 ml. of 90% acetic acid was treated with a solution of 6 g. of chromium trioxide in 50 cc. of 90% acetic acid for 1 hour and maintaining the temperature below 20° C. It was then kept at 25° C. for 3 hours, poured into water and the product was extracted with methylene chloride; the extract was washed with aqueous sodium bicarbonate solution and with water to neutral, dried over anhydrous sodium sulfate and evaporated. Recrystallization of the residue from acetone-hexane yielded B-homo-androstane-3,17-dione with M.P. 109–115° C. Several recrystallizations from acetone-hexane produced the analytical sample, having a melting point between 113 and 116° C.; $[\alpha]_D$ +119° (chloroform) infrared maxima $(CS_2)$ at 1718 cm.$^{-1}$ and 1736 cm.$^{-1}$.

Example XIV

To a solution of 2 g. of B-homo-androstane-3,17-dione of the preceding Example in 200 cc. of absolute ethanol was added 20 g. of Raney nickel ("Organic Synthesis," Coll. Vol. III, 1955, page 181) which had been prepared 3 months before and which was no longer pyrophoric. The mixture was refluxed for 5 hours, filtered through celite, the filter was washed with ethanol and the filtrate was evaporated. The residue consisted of a mixture of the 3α and 3β-isomers of B-homo-androstan-3-ol-17-one (B-homo-androsterone and B-homo-epi-androsterone, respectively); by chromatography on 60 g. of neutral alumina there were separated the two isomers, giving as main product B-homo-androstan-3α-ol-17-one.

Example XV 2 g. of B-homo-androstane-3,17-dione was hydrogenated in the presence of recently prepared Raney nickel until the equivalent of 1 mol of hydrogen had been absorbed. By the usual work-up there was obtained as main product B-homo-androstan-3β-ol-17-one.

Example XVI

To the B-homo-androstan-3-ol-17-ones of the two preceding examples were applied the methods of formation of the 17α-alkyl(alkenyl, alkinyl)-17β-hydroxyl grouping described in Examples VIII–X, that is, the respective steroids were treated with methyl magnesium bromide, ethyl-lithium and potassium acetylide, respectively; in its case, the ethinyl group was reduced to the vinyl group by partial hydrogenation. There were thus prepared 17α-methyl-B-homo-androstane-3α,17β - diol, 17α-methyl-B-homo-androstane - 3β,17β - diol, 17α - ethyl-B-homo-androstane-3α,17β-diol, 17α - ethyl-B-homo-androstane-3β,17β-diol, 17α-ethinyl-B-homo-androstane-3α,17β-diol, 17α-ethinyl-B-homo-androstane-3β,17β-diol, 17α-vinyl-B-homo-androstane - 3α,17β - diol, and 17α-vinyl-B-homo-androstane-3β,17β-diol.

Example XVII

To a solution of 1 g. of 17α-methyl-B-homo-dihydroallotestosterone (Example II) in 50 cc. of methanol was added a solution of 1 g. of sodium borohydride in 10 cc. of water and the mixture was refluxed for 1 hour and cooled. The excess of hydride was decomposed by the slow addition of acetic acid, concentrated under reduced pressure and water was added until complete precipitation of the reaction product, which was collected, washed with water and dried. By subsequent chromatography on neutral alumina there was obtained as main product the 3β-isomer, namely 17α-methyl-B-homo-androstane-3β,17β-diol, besides a small amount of 17α-methyl-B-homo-androstane-3α,17β-diol.

In accordance with the method of reduction described above, all of the 17α-substituted B-homo-dihydroallotestosterone, B-homo-Δ¹-androsten-17β-ol-3-one, B-homo-Δ⁴-androsten - 17β - ol - 3 - one and B-homo-Δ¹,⁴-androstadien-17β-ol-3-one were converted into the corresponding diols.

The reaction with sodium borohydride described above was applied to B-homo-androstane-3,17-dione to form as main product B-homo-androstane-3β,17β-diol; by the procedure set forth there was further treated B-homo-androsterone to produce B-homo-androstane-3α,17β-diol.

Example XVIII

For hydrolysis of the acetylated B-homo-compounds described in the preceding examples, 1.0 g. of the steroid was treated with 50 cc. of 1% solution of potassium hydroxide in methanol for 1 to 5 hours, at temperatures between 0° C. and 10° C., preferably under an atmosphere of nitrogen.

Reesterification of the secondary hydroxyl groups was then effected by treating 1.0 g. of the steroid in 10 cc. of pyridine with an excess of the anhydride or chloride of a hydrocarbon carboxylic acid of the type set forth previously at room temperature over a period between 6 and 48 hours, employing a prolonged reaction time (up to 48 hours) when the esterification was conducted with the anhydrides or chlorides of polycarboxylic acids.

Esterification of the tertiary hydroxyl groups at C–17β was conducted by reaction with the anhydride of a hydrocarbon carboxylic acid containing up to 12 carbon atoms as previously described, in the presence of an acid catalyst, preferably also in the presence of a solvent. For example, acetylation of the tertiary hydroxyl group was achieved by treating the steroid in acetic acid with acetic anhydride in the presence of p-toluenesulfonic acid; other esters were formed, as well as the acetate, by reaction of the steroid containing the tertiary hydroxyl group with the respective anhydride in benzene and in the presence of p-toluenesulfonic acid, for a period of time between 12 and 72 hours, a prolonged reaction time being employed when a polycarboxylic acid anhydride was the esterifying agent. The reaction in the presence of p-toluenesulfonic acid also effected the esterification of free secondary hydroxyl groups. Where the latter had been previously esterified by reaction with the anhydride or chloride in pyridine, there was thus prepared diesters containing radicals different from each other.

By the methods described above, the B-homo compounds were first converted into the free alcohols and then there were prepared the diacetates, dipropionates and dicyclopentylpropionates of B-homo-androstane-3α,17β-diol, B-homo-androstane-3β,17β-diol, 17α-methyl-B-homo-androstane-3α,17β-diol, 17α-methyl-B-homo-androstane-3β,17β-diol, 17α - ethyl-B-homo-androstane-3α,17β-diol, 17α-ethyl-B-homo-androstane-3β,17β-diol, 17α-ethinyl-B-homo-androstane-3α,17β-diol, 17α-ethinyl-B-homo-androstane - 3β,17β - diol, 17α - vinyl-B-homo-androstane-3α,17β - diol, 17α - vinyl-B-homo-androstane-3β,17β-diol, and of the 1-dehydro, 4-dehydro and 1,4-bisdehydro derivatives of all of the above compounds.

Example XIX

By following the method described in the preceding examples, there were prepared from the 17α-methyl-B-homo-androstane-3(α or β), 17β-diols, 17α-ethyl-B-homo-androstane-3(α or β),17β-diols, 17α-ethinyl-B-homo-androstane-3(α or β),17β-diols and 17α-vinyl-B-homo-androstane-3(α or β),17β - diols the corresponding 3-acetates-17-propionates; 3-propionates-17-acetates; 3-cyclopentylpropionates - 17 - acetates; 3-acetates-17-caproates; 3-propionates-17-cyclopentylpropionates.

Example XX

By following the conventional method of esterification described in Example XVIII, there were prepared the acetates, propionates, isobutyrates and cyclopentylpropionates of B-homo-androstan-3α-ol-17-one, B-homo-androstan-3β-ol-17-one, B - homo-Δ⁴-androsten-17β-ol-3-one, B-homo-dihydroallotestosterone, B-homo-Δ¹-androsten-17β-ol-3-one and B-homo-Δ¹,⁴-androstadien-17β-ol-3-one.

Example XXI

By following the methods of esterification described in Example XVIII, there were prepared the acetates, propionates, isobutyrates and cyclopentylpropionates of 17α-methyl-, 17α-ethyl-, 17α-ethinyl-, and 17α-vinyl derivatives of B-homo-Δ⁴-androsten-17β-ol-3-one, B-homo-Δ¹,⁴-androstadien-17β-ol-3-one, B - homo-dihydroallotestosterone and B-homo-Δ¹-androsten-17β-ol-3-one.

I claim:

1. A compound of the following formula:

wherein R' and R³ are selected from the group consisting of hydrogen and a hydrocarbon carboxylic acyl group containing up to 12 carbon atoms; R² is selected from the group consisting of hydrogen and an aliphatic hydrocarbon radical containing from 1 to 8 carbon atoms; and Z is selected from the group consisting of a double bond between C–1 and C–2 and a saturated linkage between C–1 and C–2.

2. B-homo-androstane-3β,17β-diol.
3. B-homo-androstane-3α,17β-diol.
4. B-homo-androstane-3β,17β-diol diacetate.
5. 17α-methyl-B-homo-androstane - 3α,17β - diol-dipropionate.
6. 17α-ethyl-B-homo-androstane-3β,17β-diol.
7. 17α-ethinyl-B-homo-androstane-3α,17β-diol.
8. 17α-vinyl-B-homo-androstane-3β,17β-diol.
9. B-homo - Δ¹ - androstene-3β,17β-diol-3-acetate-17-propionate.
10. A compound of the following formula:

wherein R' and R³ are selected from the group consisting of hydrogen and a hydrocarbon carboxylic acyl group containing up to 12 carbon atoms; R² is selected from the group consisting of hydrogen and an aliphatic hydrocarbon radical containing from 1 to 8 carbon atoms; and Z is selected from the group consisting of a double bond between C–1 and C–2 and a saturated linkage between C–1 and C–2.

11. B-homo-Δ⁴-androstene-3α,17β-diol.
12. B-homo-Δ¹,⁴-androstadiene-3β,17β-diol.

13. 17α - ethyl-B-homo-Δ⁴-androstene-3β,17β-diol-diacetate.

14. 17α-ethinyl-B-homo-Δ¹,⁴-androstadiene-3α,17β-diol.

15. A compound of the following formula:

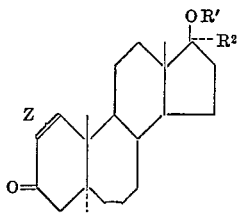

wherein R' is selected from the group consisting of hydrogen and a hydrocarbon carboxylic acyl group containing up to 12 carbon atoms; R² is selected from the group consisting of hydrogen and an aliphatic hydrocarbon radical containing from 1 to 8 carbon atoms; and Z is selected from the group consisting of a double bond between C-1 and C-2 and a saturated linkage between C-1 and C-2.

16. B-homo-dihydroallotestosterone.

17. B-homo-Δ¹-androsten-17β-ol-3-one.

18. 17α - methyl - B - homo-dihydroallotestosterone propionate.

19. 17α-ethinyl-B-homo-dihydroallotestosterone acetate.

20. A compound of the following formula:

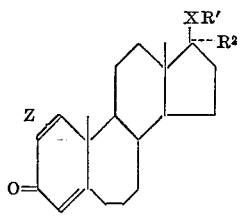

wherein R' is selected from the group consisting of hydrogen and a hydrocarbon carboxylic acyl group containing up to 12 carbon atoms; R² is selected from the group consisting of hydrogen and an aliphatic hydrocarbon radical containing from 1 to 8 carbon atoms; and Z is selected from the group consisting of a double bond between C-1 and C-2 and a saturated linkage between C-1 and C-2.

21. B-homo-Δ⁴-androsten-17β-ol-3-one.

22. B-homo-Δ¹,⁴-androstadien-17β-ol-3-one acetate.

23. 17α-ethyl-B-homo-Δ⁴-androsten-17β-ol-3-one.

24. 17α - ethinyl-B-homo-Δ¹,⁴-androstadiene-17β-ol-3-one.

25. A compound of the following formula:

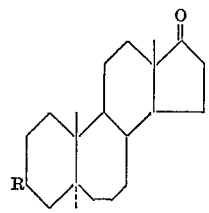

wherein R is selected from the group consisting of keto, α-hydroxy, β-hydroxy, α-hydrocarbon carboxylic acyloxy containing up to 12 carbon atoms and β-hydrocarbon carboxylic acyloxy containing up to 12 carbon atoms.

26. B-homo-androstane-3,17-dione.

27. B-homo-androstan-3α-ol-17-one.

28. B-homo-androstan-3β-ol-17-one.

29. B-homo-androstan-3α-ol-17-one acetate.

30. B - homo-androstan-3β-ol-17-one cyclopentylpropionate.

References Cited in the file of this patent

UNITED STATES PATENTS

| | | |
|---|---|---|
| 2,839,537 | Meischer et al. | June 17, 1958 |
| 2,880,233 | Clinton | Mar. 31, 1959 |
| 2,904,545 | Reichstein et al. | Sept. 15, 1959 |

OTHER REFERENCES

Fieser et al.: "Steroids," pages 925–6 (1959) (Reinhold).

Burtner et al.: "J. of Org. Chem.," vol. 25, pages 582–4 (1960).

UNITED STATES PATENT OFFICE
CERTIFICATE OF CORRECTION

Patent No. 3,059,019                                            October 16, 1962

Howard J. Ringold

It is hereby certified that error appears in the above numbered patent requiring correction and that the said Letters Patent should read as corrected below.

Column 13, lines 28 to 37, the formula should appear as shown below instead of as in the patent:

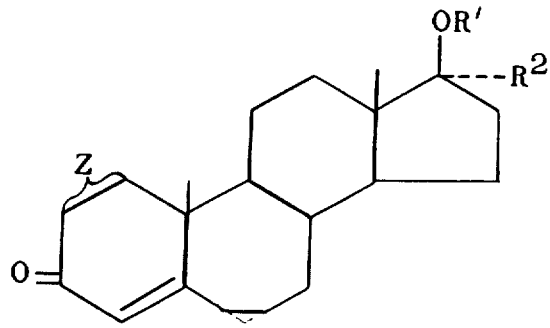

Signed and sealed this 26th day of February 1963.

(SEAL)
Attest:

ESTON G. JOHNSON
Attesting Officer

DAVID L. LADD
Commissioner of Patents